United States Patent [19]

Koskovich

[11] Patent Number: 4,516,675

[45] Date of Patent: May 14, 1985

[54] CONVEYOR FEED MECHANISM

[76] Inventor: Jerome E. Koskovich, R.R. 2, Byron, Minn. 55920

[21] Appl. No.: 383,502

[22] Filed: Jun. 1, 1982

[51] Int. Cl.³ .............................................. B65G 47/74
[52] U.S. Cl. ................................ 198/654; 104/172 B; 144/242 B; 144/245 B
[58] Field of Search ............... 198/654, 838, 845, 687, 198/728, 735, 748; 144/242 B, 245 R, 245 A, 245 B; 83/409, 409.1, 422, 508.2, 425.1, 425.2, 425.3, 425.4, 435.2; 104/172 B, 172 R, 245, 140

[56] References Cited

U.S. PATENT DOCUMENTS

| | | | |
|---|---|---|---|
| 1,334,822 | 3/1920 | Varble | 198/654 |
| 2,298,955 | 10/1942 | Mason et al. | 198/654 |
| 2,679,919 | 6/1954 | Koning | 198/459 |
| 2,758,696 | 8/1956 | Eyler | 198/838 |
| 2,864,412 | 12/1958 | Ponder | 83/409 |
| 3,269,524 | 8/1966 | Canfield | 198/654 |
| 3,315,790 | 4/1967 | Hohl | 198/728 |
| 3,906,866 | 9/1975 | Knippel | 104/245 |
| 4,023,672 | 5/1977 | Haley | 198/735 |
| 4,098,395 | 7/1978 | Olsson | 198/748 |
| 4,233,907 | 11/1980 | Brown et al. | 104/172 B |
| 4,445,411 | 5/1984 | Purcell | 198/748 |

FOREIGN PATENT DOCUMENTS

| | | | |
|---|---|---|---|
| 1245853 | 7/1967 | Fed. Rep. of Germany | 198/728 |
| 86631 | 6/1936 | Sweden | 198/845 |

Primary Examiner—Joseph E. Valenza
Assistant Examiner—Daniel R. Alexander
Attorney, Agent, or Firm—Paul L. Sjoquist

[57] ABSTRACT

A conveyor feed mechanism, particularly adapted for multiple cut saw machines wherein lumber is fed onto an endless conveyor for moving and clamping during multiple cutting operations. A dual-truck conveyor mechanism is attached to the endless conveyor chain, one of the trucks having an access seat and backstop for receiving and supporting lumber, and the other truck having a pivotal clamp held in a spring-biased position for clamping against the lumber, both trucks having side rollers for guiding through a channel adjacent the conveyor line.

3 Claims, 6 Drawing Figures

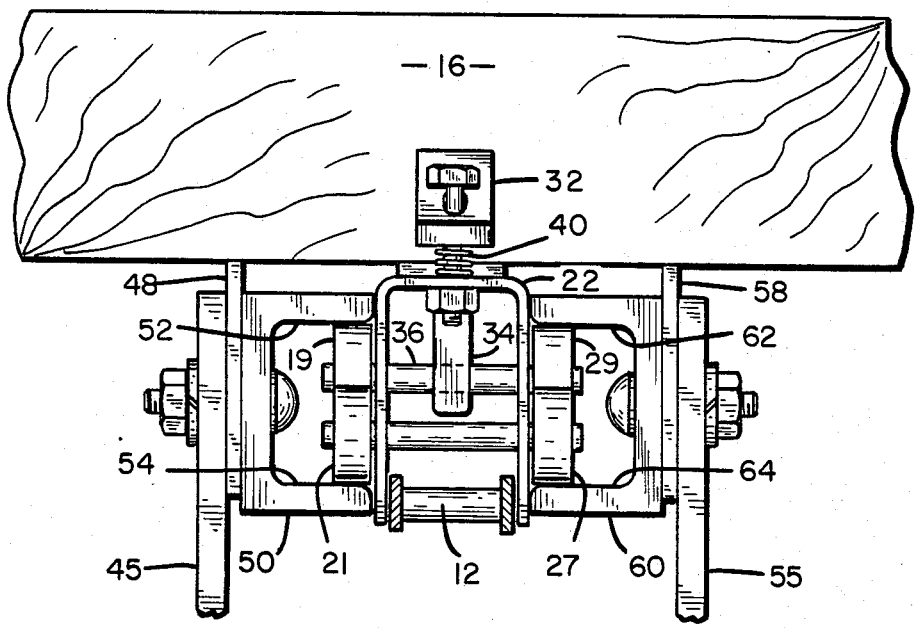
Fig. 4
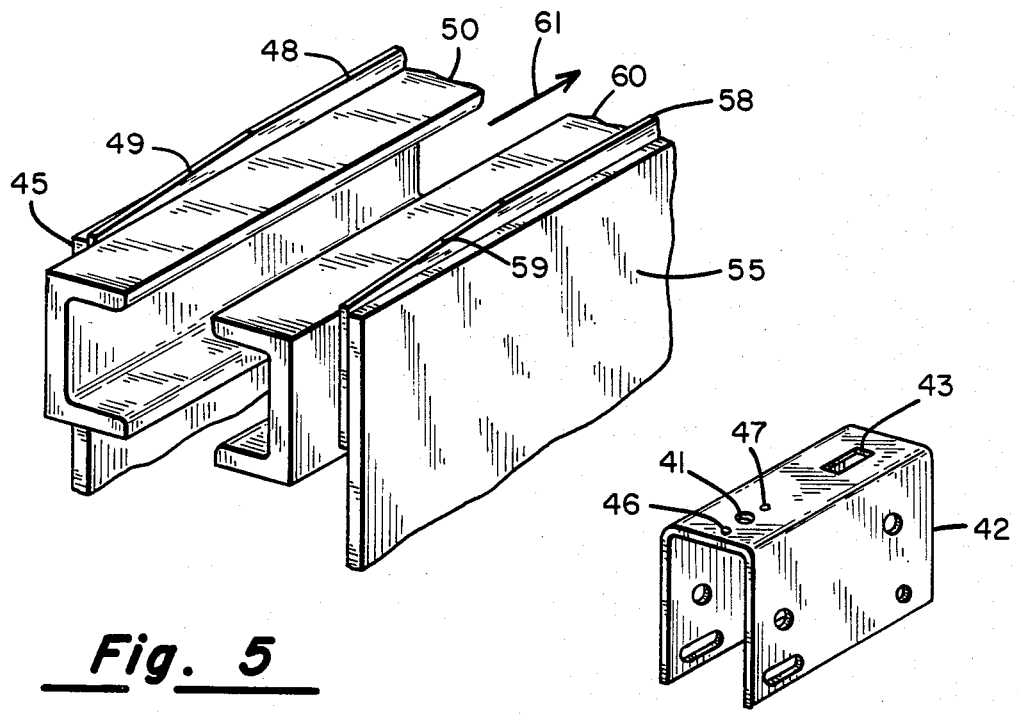
Fig. 5
Fig. 6

CONVEYOR FEED MECHANISM

BACKGROUND OF THE INVENTION

This invention relates to endless conveyor systems for use in industrial manufacturing processes, and more particularly to an endless conveyor for feeding raw wood material into a multiple cut saw machine.

Multiple cut saw machines have been developed for making two or more angular cuts at either end of a wood member by the use of two or more pairs of laterally-spaced circular saws. These saws are positionable adjacent to an endless conveyor system which is adapted for receiving raw lumber at one end and either fixedly holding or loosely pushing the lumber while conveying it along a cutting path where it subsequently is cut by the saws.

Early saw machines utilized conveyors with a series of lugs or backrests which attempted to push the lumber, standing on edge, along the conveyor and through the saws. If the lumber was twisted or warped, or if its edgewise height was greater than that of the lug or backrest it was susceptible to falling forward or rearward over the backrest, thereby placing the lumber in an improper position for cutting and creating a possible hazard for saw operators.

A variety of attempts have been made to provide greater stability as the lumber was moving along the conveyor and through the saws. Some saws use slide rails or powered conveyor chains positioned above and contacting the lumber and running parallel to the main conveyors. These are only moderately successful and create at least two potential hazards, one being the saw operator must often physically stabilize the lumber while it engages the upper guide or conveyor, and the other being the interfacing of saw blades with the overhead guides or conveyors as saws are rotated into position for certain angular cuts.

One attempted improvement over the conveyor systems described above may be found in U.S. Pat. No. 3,388,727, issued June 18, 1968, which discloses a machine of the general type referred to herein, wherein the conveyor comprises an endless chain assembly having outward projections or dogs spaced at predetermined intervals along the chain links. These dogs are arranged in pairs, the trailing dog having a flat rectangular surface for seating against the lumber, and the leading dog having a sharp rearward spike for embedding into the lumber to firmly hold it while it travels along the conveyor chain. A further disclosure of this invention may be found in U.S. Pat. No. 3,416,643, issued Dec. 17, 1968. The disclosures of these patents suffer from several disadvantages, which disadvantages are also common to other known devices in the prior art. Since the conveyor dogs are attached directly to the conveyor chain, their flexibility of use and position is directly related to the chain itself. For example, the dogs are intended to be spaced apart by a fixed distance along the conveyor chain such that a "standard" dimension piece of lumber will be clamped between them with a predetermined force. To the extent that "standard" lumber varies from the dimensions commonly though to be standard, the clamping force provided by the dogs may be more or less than that required for adequately supporting the lumber. If a given piece of lumber deviates from standard dimensions by being wider than normal, it may place an undue strain on the clamping dogs, which strain is transmitted directly to the chain as a stretching force. Repeated instances of handling non-standard sized lumber may prematurely weaken or damage the chain, and further may move the dogs to spaced apart positions which cause them to inadequately clamp normal or undersized pieces of lumber. Further, the lumber that is clamped between the dogs may have an imperfect vertical position resolution. Since the clamping action of the dogs is accomplished while they are traveling around a circular sprocket, there may be a tendency for the lumber to shift vertically before the front dog is firmly embedded in the lumber. Indeed, the very penetration of the front dog into the lumber may have a tendency to slightly raise the lumber. Once clamped, the lumber will remain in its clamped position regardless of whether it is precisely aligned as is required for the sawing operations. Because of the various problems associated with the previously described clamping conveyor system it has met with little commercial success, and the overhead guide rails and powered conveyors remain the most frequently used state of the art.

There is therefore a need for a lumber clamping mechanism which may be suitable for accepting both undersized and oversized lumber, without causing undue strain to the conveyor chain, and which will reliably and consistently provide a constant vertical and longitudinal reference for the lumber position during the cutting operations.

SUMMARY OF THE INVENTION

The invention comprises a pair of trucks attached to an endless conveyor chain for conveyance along a conveyor line, the forward truck having a pivotal clamp arm which is held in a predetermined position by a spring biasing mechanism. The rearward truck having a pivoting backrest for supporting one or more sizes of standard lumber. Each of the trucks has side rollers which are adapted for rolling through a pair of spaced apart facing U-channel tracks, and thereby holding the respective trucks in predetermined vertical positions. The channels further comprise raised outer edges for elevating and supporting the lumber with reference to a precise fixed vertical reference point during its movement through the conveyor system.

It is therefore a principal object of the invention to provide a conveyor feed mechanism for transporting lumber along a conveyor line at a precise reference position relative to the conveyor line.

It is another object of the present invention to provide a mechanism for clamping lumber at a predetermined reference position, and for moving the lumber without distorting the reference position.

It is a further object of the present invention to provide a conveyor clamping and feeding mechanism having the ability to accept and clamp lumber of varying sizes.

BRIEF DESCRIPTION OF THE DRAWINGS

The foregoing and other objects and advantages of the invention will become apparent from the appended specification, and with reference to the attached drawings, in which:

FIG. 4 shows a cross section of the invention;

FIG. 5 shows an isometric view of the conveyor channel adaptable for use with the invention; and FIG. 6 shows an isometric view of one part of the invention.

DESCRIPTION OF THE PREFERRED EMBODIMENT

Figure 1:
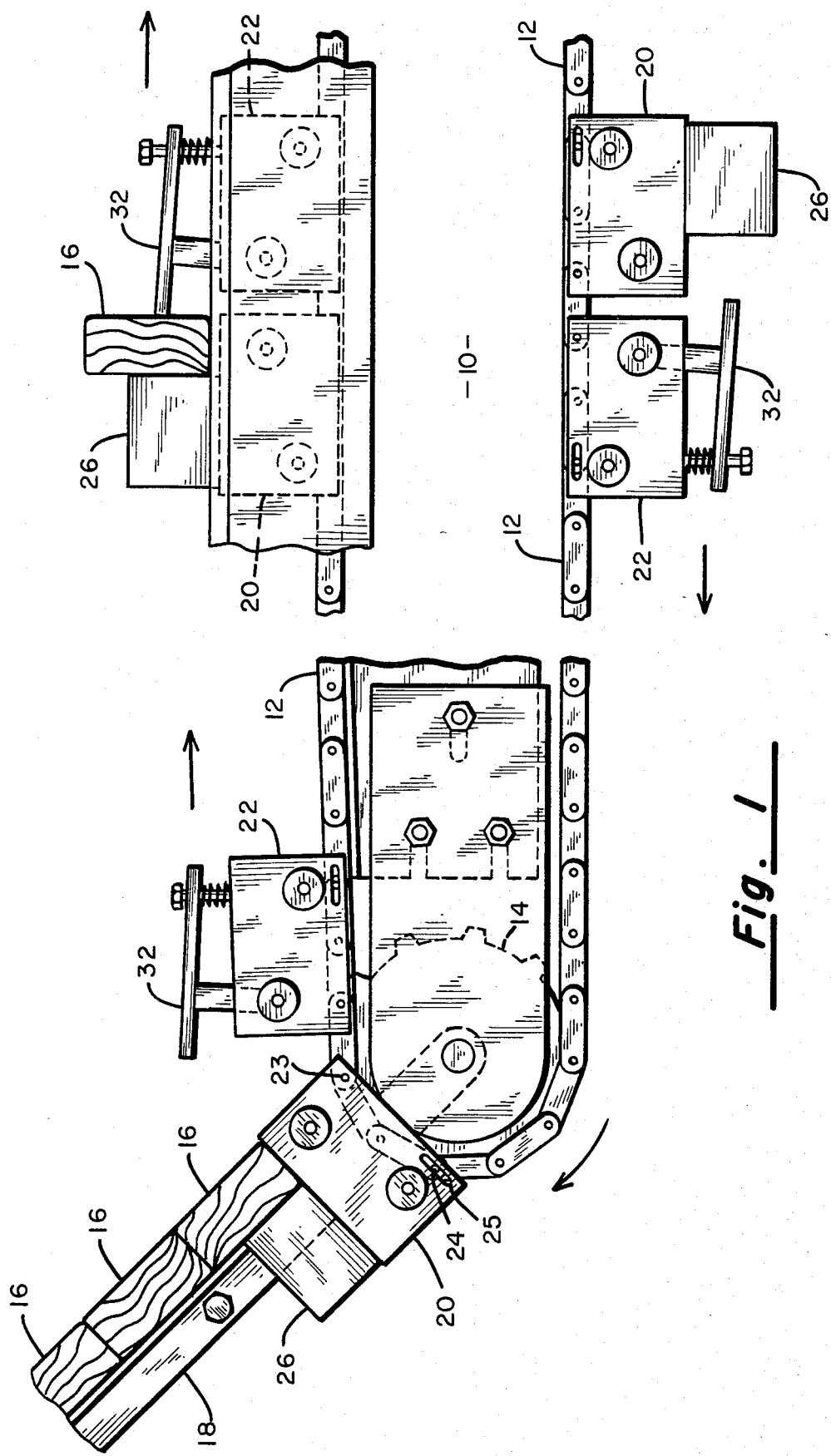
FIG. 1 shows a side view of a portion of the conveyor system with the invention attached.

Referring first to FIG. 1, there is shown a conveyor line 10 with which the invention is adapted for use. Conveyor line 10 utilizes an endless loop chain 12 for conveying lumber 16 onto a workbed or a platform wherein cutting operations may be performed on the lumber. Chain 12 turns about a sprocket 14, one of which is placed at front and back of the cutting machine for continuously moving chain 12. A feed mechanism 18 is arranged in the vicinity of sprocket 14 for the purpose of feeding lumber into the cutting machine. FIG. 1 shows a partial elevation view of one such conveyor line 10; in a typical cutting machine of the type commonly used in industry there are two parallel conveyor lines 10 spaced apart at distances ranging from several feet to perhaps twenty feet. These parallel conveyor lines are designed to transport framing lumber into cutting saw blades which have been prepositioned for selected angular and other cutting operations to the ends of the lumber, the saw blades being placed on either side of the respective conveyor lines. As the parallel conveyor lines transport the lumber through the plurality of cutting saws, a wide variety of preselected cuts may automatically be made simultaneously at both ends of the lumber, for the conveying mechanism securely holds the lumber while such cuts are being made.

The conveying and transport of an end of each piece of lumber 16 is accomplished by a pair of trucks 20 and 22. Each of the trucks 20 and/or 22 is mounted to chain 12 by means of pins, as for example pins 23 and 24 in the case of truck 20. Pin 23 pivotally attaches truck 20 to chain 12, and pin 24 attaches truck 20 to chain 12 through an elongated slot 25. A plurality of pairs of trucks 20 and 22 are spaced along endless loop chain 12.

Figure 2:
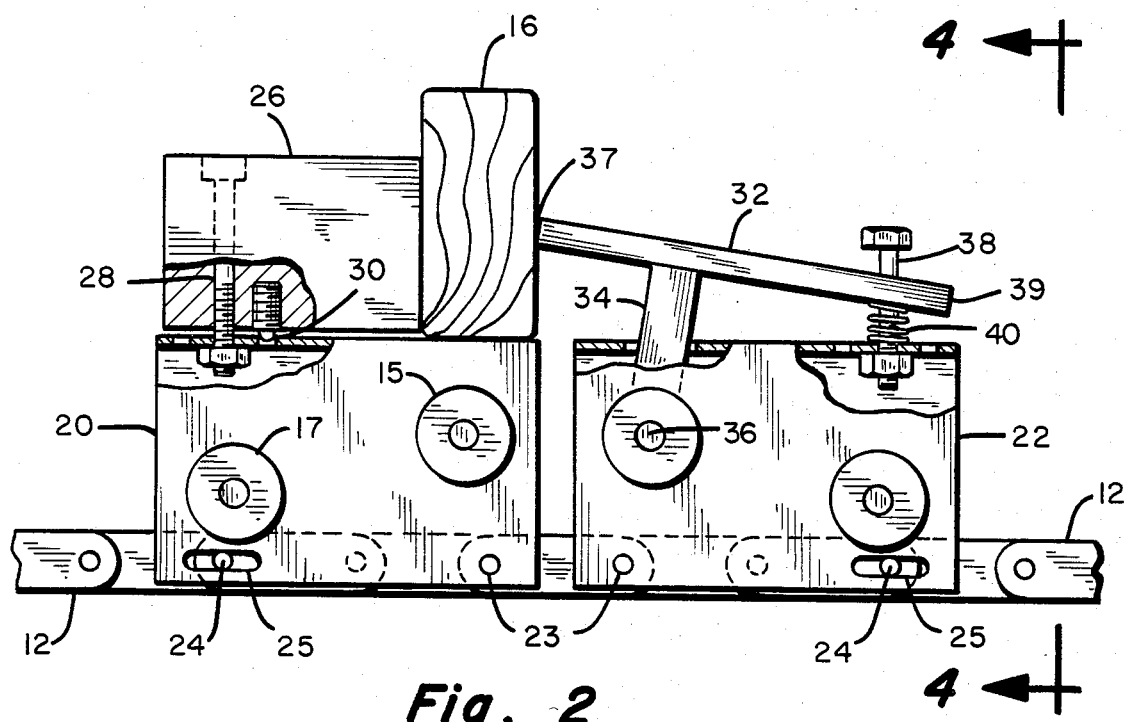
FIG. 2 shows side elevational view of the invention in a first operating position.

FIG. 2 shows an elevational view, in partial cutaway, of trucks 20 and 22 attached to chain 12. A standard dimension length of 2×4 lumber 16 is shown clamped between trucks 20 and 22. Lumber 16 rests against a backrest 26, which is pivotally attached to truck 20 by means of fastener 28. A spring loaded ball 30 is mounted in backrest 26, the ball 30 being urged against a detent hole in truck 20. Ball 30 thereby holds truck 20 under a predetermined detent force in the position shown in FIG. 2. Truck 22 is also attached to chain 12, and has mounted thereon a clamping arm 32. Clamping arm 32 is fixedly attached to a pivoting member 34, which member 34 pivots about axle 36. A fastener 38 passes through clamping arm 32 and attaches to truck 22. A spring 40 is compressed between the underside of clamping arm 32 and the upper surface of truck 22, and urges the end 39 of clamping arm 32 upward. Clamping arm 32 therefore is urged in a counterclockwise direction motion about axle 36, thereby holding the distal end 37 of clamping arm 32 against board 16.

Figure 3:
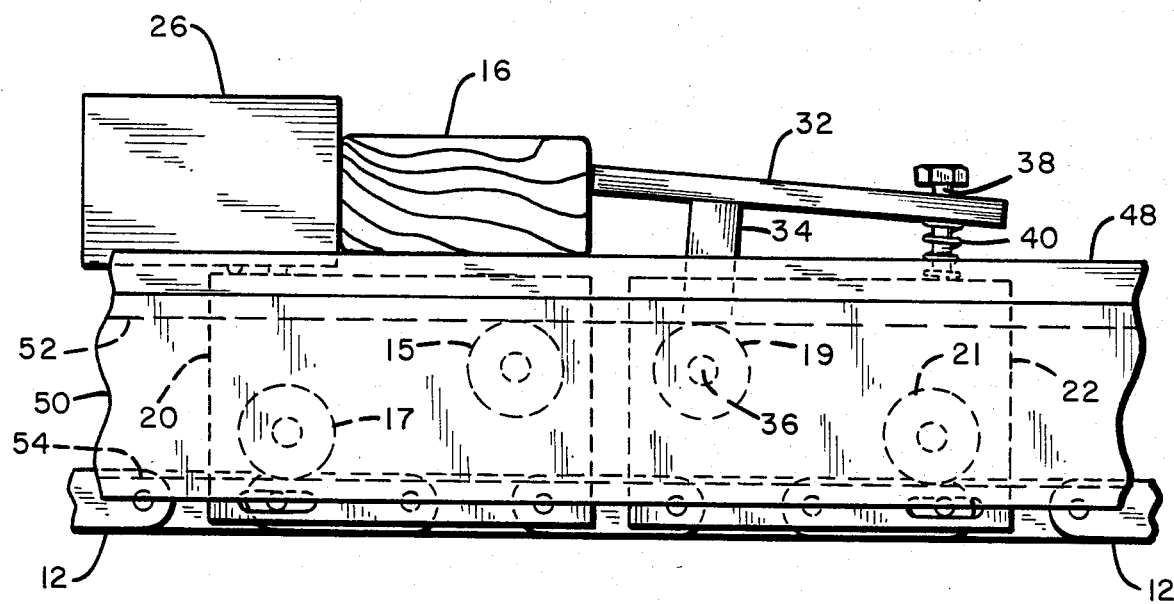
FIG. 3 shows a side elevational view of the invention in a second operating position.

FIG. 3 shows backrest 26 pivoted to a second backrest position. In this position, backrest 26 can accommodate a wider dimension of lumber 16. FIG. 3 also shows trucks 20 and 22 riding in a channel 50, wherein wheel 15 of truck 20 and wheel 19 of truck 22 bear against an upper flange 52. Similarly, wheel 17 of truck 20 and wheel 21 of truck 22 bear against a lower flange of channel 50. Trucks 20 and 22 are therefore held in precise vertical registration, flanges 52 and 54 permitting neither upward nor downward movement of the respective trucks. A rail 48 projects above the top of channel 50, and supports lumber 16 in a manner to be hereinafter described.

FIG. 4 shows an end view taken along the lines 4—4 of FIG. 2. Truck 22 is positioned between channels 50 and 60, its wheels 19 and 29 bearing against upper flanges 52 and 62 respectively, and its wheels 21 and 27 bearing respectively against lower flanges 54 and 64. A rail 48 is raised above channel 50, and is securely attached thereto. Similarly, a rail 58 is fixedly attached above rail 60. The lower edge of lumber 16 is supported and guided by rails 48 and 58.

FIG. 5 shows an isometric view of channels 50 and 60, illustrating particularly the construction adjacent the conveyor feeding means. A rail 48, being fixedly attached between channel 50 and a supporting frame 45, has a tapered initial slope 49. Similarly, rail 58 is rigidly attached between channel 60 and support frame 55, and rail 58 has a tapered initial slope 59. The respective tapered surfaces 49 and 59 are positioned near the feed mechanism, to accept lumber as it approaches the conveyor working portion. As lumber approaches the conveyor system the lower surface of the lumber is contacted against slope surfaces 49 and 59, and as the lumber progresses in the direction of the arrow 61 it is raised by a predetermined amount. Rails 48 and 58 then guide and support the lumber through the work operations conducted by the machine associated with the conveyor.

FIG. 6 shows a truck 22 or 20 body member 42, it being apparent that the same body member 42 may be interchangeably used as a body member for either truck 20 or for truck 22. A slot 43 may be used for inserting pivotal member 34. Detents 46 and 47 may be stamped into body member 42, for the purpose of providing an indexing location for backrest 26. Hole 41 may be punched into body member 42 for the purpose of accepting fastener 28, or alternatively for accepting fastener 38. The side holes through body member 42 are adapted for attachment to the wheels, axles and chain link pins, and are equally adaptable when body member 42 is used as an element of truck 20 or as an element of truck 22.

In operation lumber is stacked on feed mechanism 18 for feeding into the cutting machine. The cutting saws are adjusted for the proper angular and length dimensions and the conveyor is then started. As each pair of trucks 20, 22 rotates about the chain sprocket adjacent the feed mechanism the respective trucks become somewhat spaced apart. The conveyor feed mechanism is set to deliver lumber to the truck 20 as it passes through the circular arc where it is spaced away from truck 22, and the lumber is moved forward along the conveyor by backrest 26. As the two trucks 20, 22 complete their circular path of travel about the sprocket they again become linearly aligned and spaced closer together. Truck 22 moves relatively against the board so that clamp arm 32 applies a holding force against the lumber. As the trucks continue to move along the conveyor they engage channels 50 and 60, and the board slides up the inclined ramp on rails 48 and 58. Rails 48 and 58 cause the lumber to become precisely indexed, where all successive saw cuts through the board can be accurately gauged. It should be noted that rails 48 and 58 provide complete support for even short lengths of board, and the invention is therefore adaptable for operation with either long or short lumber. In either case, the lumber will be supported along its bottom edge by rails 48 and 58, and will be supported along its near edge by backrest 26, and will be supported along its front edge by clamping arm 33.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A conveyor feed and transport mechanism adapted for use with an endless conveyor, for supporting a workpiece in vertical registration and transporting same along a horizontal path of said conveyor, comprising
   (a) a pair of parallel channel members longitudinally aligned adjacent respective sides of said endless conveyor, each of said channels comprising a pair of spaced apart horizontal planes adjacent said endless conveyor and a vertical edge positioned higher than said conveyor, said vertical edge having an inclined surface from a first conveyor entrant position to a second higher position, and a horizontal surface thereafter parallel to said horizontal planes;
   (b) a pair of trucks attached to said endless conveyor and each truck having a first pair of wheels positioned for rolling against one of said spaced apart horizontal planes, and a second pair of wheels positioned for rolling against the other of said spaced apart horizontal planes, and each truck having an upper surface bridging said endless conveyor, said upper surface being lower than said vertical edge horizontal surface;
   (c) a backrest member rotatably attached on the upper surface of one of said trucks and spring-biased detent means between said backrest member and said upper surface of said one of said trucks, for presetting said backrest member into either of two positions; and
   (d) a clamp arm member attached to the other of said trucks, said clamp arm member being supported above the upper surface of said other of said trucks and projecting toward said backrest member, and spring means for biasing said clamp arm member toward said backrest member.

2. The apparatus of claim 1, further comprising a stop member on said other of said trucks adapted for contacting said clamp arm member and thereby limiting the travel of said clamp arm to less than one inch.

3. A workpiece registration and transport mechanism adapted for coupling to an endless chain conveyor, comprising
   (a) a first truck attached to said chain conveyor, said first truck having a body member and a pair of axles attached to said body member, and a pair of wheels rotatably mounted to each of said axles, said first truck further having a spring-biased arm facing rearward and pivotally connected about one of said axles;
   (b) a second truck attached to said chain conveyor, said second truck having a body member and a pair of axles attached to said body member, and a pair of wheels rotatably mounted to each of said axles, said second truck further having backrest means for supporting an article to be conveyed, said backrest means comprising a bar pivotally attached to said second truck body member and detent means for holding said bar under detent forces in and of two preselected positions;
   (c) a horizontal channel guide aligned adjacent said chain conveyor, said channel guide having means for receiving respective wheels of said first and second trucks in stable alignment and for guiding said trucks along said chain conveyor; and
   (d) a vertical workpiece guide attached to said horizontal channel guide, said vertical guide having an upper workpiece registration surface, including an inclined portion above said chanel guide means for receiving and a horizontal portion; whereby a workpiece may be supported between said first and second trucks and by said vertical guide upper registration surface.

* * * * *